(12) United States Patent
Noda

(10) Patent No.: US 6,288,820 B1
(45) Date of Patent: Sep. 11, 2001

(54) IMAGE SCANNING LENS HAVING FOUR LENS ELEMENTS AND AN IMAGE SCANNING UNIT THAT USES IT

(75) Inventor: Takayuki Noda, Urawa (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/625,025

(22) Filed: Jul. 25, 2000

(30) Foreign Application Priority Data

Jul. 26, 1999 (JP) .................................................. 11-210661
Jul. 21, 2000 (JP) .................................................. 12-221245

(51) Int. Cl.$^7$ .............................. G02B 26/08; G02B 9/34
(52) U.S. Cl. ........................................... 359/205; 359/773
(58) Field of Search .................................... 359/205–207, 359/662, 773; 358/474, 483; 347/244, 258

(56) References Cited

U.S. PATENT DOCUMENTS 5,936,783     8/1999   Nakai et al. .
6,128,120  * 10/2000   Mushiake et al. .................... 359/221

FOREIGN PATENT DOCUMENTS 7-294812    11/1995  (JP) .
9-101452     4/1997  (JP) .
11-190820    7/1999  (JP) .

* cited by examiner

Primary Examiner—James Phan
(74) Attorney, Agent, or Firm—Arnold International; Bruce Y. Arnold

(57) ABSTRACT

An image scanning lens for an image scanner unit, such as a facsimile machine or document scanner is disclosed having only four lens elements with refractive power. In order from the object side, these are: a first lens element of positive refractive power and a meniscus shape with its convex surface on the object side; a second lens element of negative refractive power that is biconcave; a third lens element of positive refractive power that is biconvex; and a fourth lens element of negative refractive power having a concave surface on the object side. Various conditions are satisfied so as to provide a compact image scanning lens with a wide angle of view, and sufficiently corrected spherical aberration, astigmatism, and distortion so as to yield, when the lens is employed in an image scanner unit, a high quality scanned image that is comparatively bright.

12 Claims, 6 Drawing Sheets

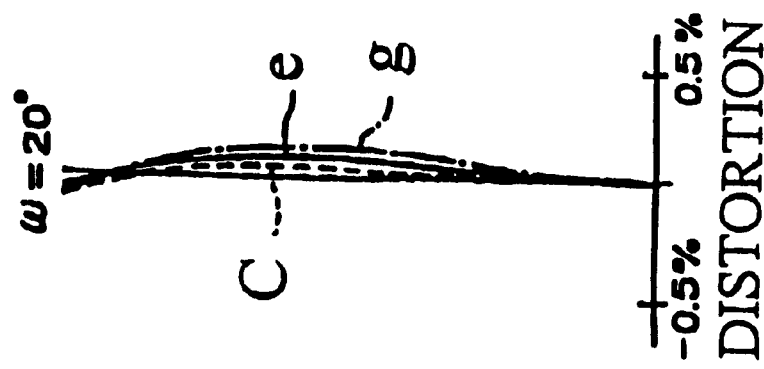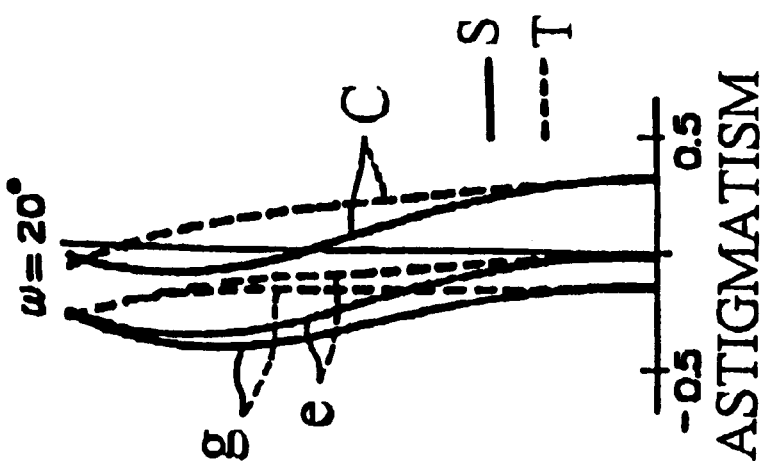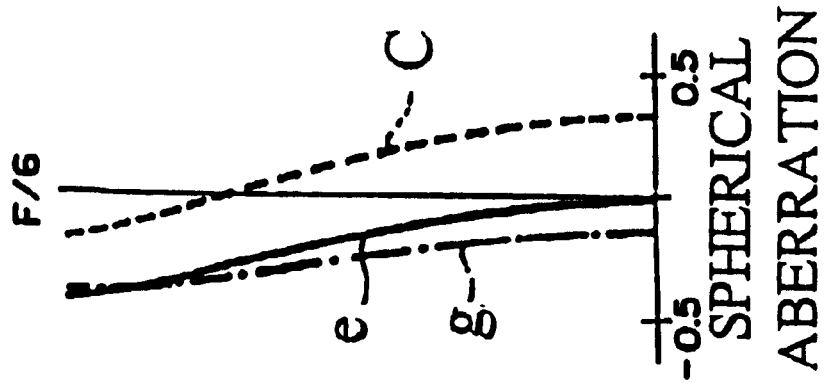

ω=20°
DISTORTION

ω=20°
ASTIGMATISM

F/6
SPHERICAL ABERRATION

IMAGE SCANNING LENS HAVING FOUR LENS ELEMENTS AND AN IMAGE SCANNING UNIT THAT USES IT

BACKGROUND OF THE INVENTION

Traditionally, in image scanning units such as a facsimile or an image scanner, a solid-state image sensor such as a CCD array is arranged in the imaging section to detect the image. In recent years, higher pixel densities for CCD arrays have been rapidly developing. Concurrent with this trend, higher resolution is required for the image scanning lens which is utilized in an image scanning unit.

Image scanning lenses having high resolution for image scanning are disclosed in Japanese Laid Open Patent Applications H7-294812, H9-101452 and H11-190820. However, in the prior art technology described in the above-mentioned publications, the image scanning lenses are not sufficiently compact, do not have as wide an angle of view as is presently desired, or do not sufficiently correct aberrations such as lateral color and the like.

BRIEF SUMMARY OF THE INVENTION

The present invention relates to an image scanning lens, and an image scanning unit that uses it, such as a facsimile machine or a scanner. More particularly, the present invention relates to an image scanning lens having four lens elements and an image scanning unit that uses it, for example, to reduce or enlarge the size of an image. The objects of the invention are to provide an image scanning lens which is more compact and has a wider angle of view than the image scanning lens of image scanners presently available, to obtain an improvement in reducing aberrations, such as lateral color and the like, and to provide an image scanning unit incorporating such an image scanning lens.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A, 2B, and 2C show the spherical aberration, astigmatism, and distortion, respectively, for the image scanning lens of Embodiment 1;

DETAILED DESCRIPTION

Figure 1:
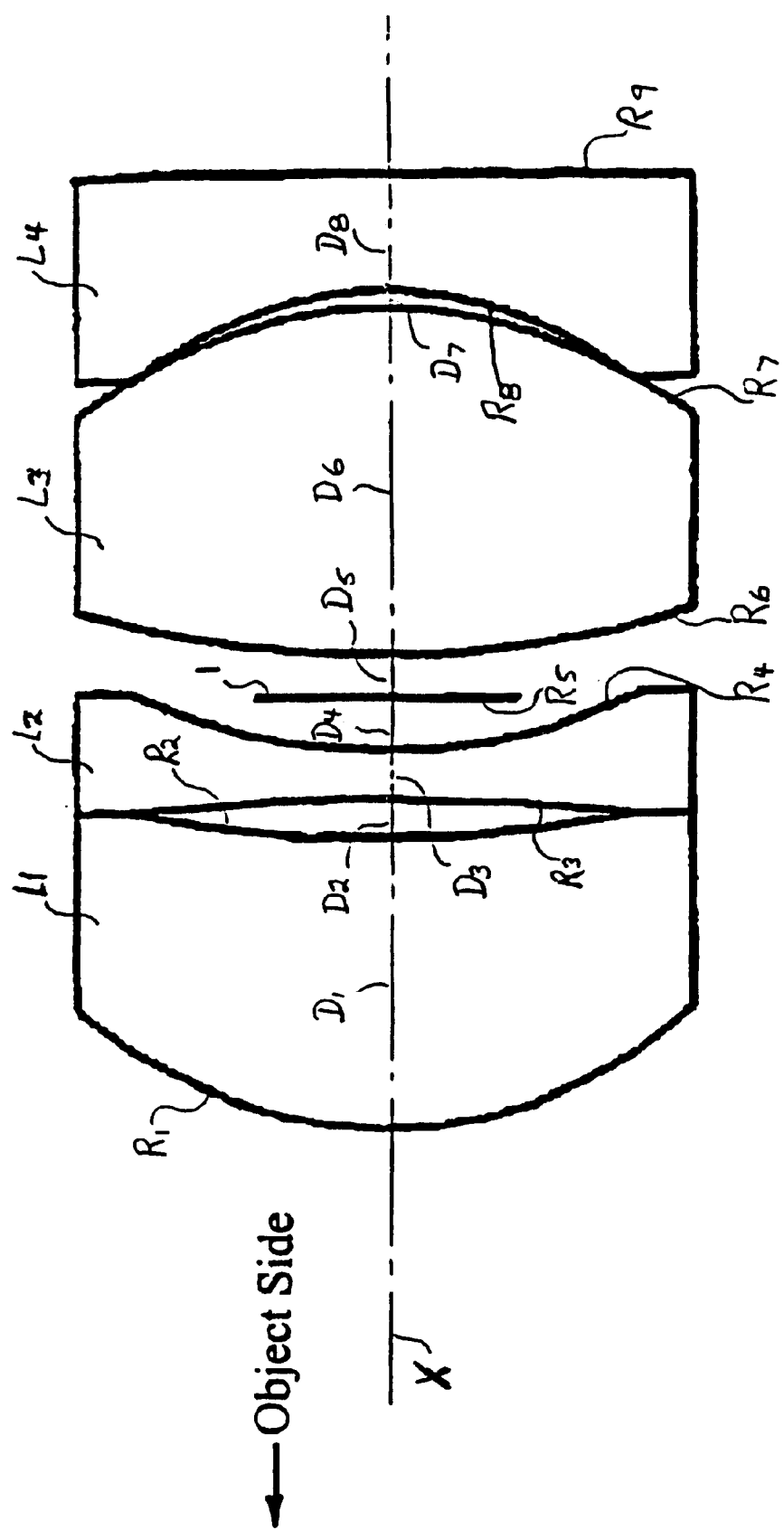
FIG. 1 shows the basic lens element construction relating to Embodiments 1–4 of the present invention.

The image scanning lens of the present invention has only four lens elements with refractive power as follows, in order from the object side: a first lens element of positive refractive power and meniscus shape with its convex surface on the object side; a second lens element of negative refractive power that is biconcave; a third lens element of positive refractive power that is biconvex; and a fourth lens element of negative refractive power having a concave surface on the object side. Additionally, the following Conditions (1) to (5) are satisfied.

$$0.09 \leq DR_3/f \leq 0.20 \quad \text{Condition (1)}$$

$$0.40 \leq |f_4/f| \leq 1.30 \quad \text{Condition (2)}$$

$$v_4 \geq 36.0 \quad \text{Condition (3)}$$

$$0.31 \leq \Sigma D_i/f \leq 0.48 \quad \text{Condition (4)}$$

$$DR_{3-4}/f \leq 0.07 \quad \text{Condition (5)}$$

where $DR_3$ is the on-axis thickness of the third lens element, in order from the object side;

f is the focal length of the image scanning lens;

$f_4$ is the focal length of the fourth lens element, in order from the object side;

$v_4$ is the Abbe number of the fourth lens element, in order from the object side;

$\Sigma D_i$ is the overall length of the image scanning, lens ( i.e., the sum of $D_1$–$D_8$); and $DR_{3-4}$ is the on-axis spacing between the third lens element and the fourth lens element, in order from the object side.

In addition, it is preferred that the following Conditions (6)–(8) are satisfied.

$$0.005 \leq DR_{3-4}/f \leq 0.02 \quad \text{Condition (6)}$$

$$\Sigma D_i/f \leq 0.45 \quad \text{Condition (7)}$$

$$v_4 \leq 36.0 \quad \text{Condition (8)}$$

where $DR_{3-4}$, f, $\Sigma D_i$, and $v_4$ are as defined above.

In addition, it is preferred that the image scanning lens also satisfy one or more of the Conditions (9)–( 11).

$$25.0 \leq v_2 \leq 36.0 \quad \text{Condition (9)}$$

$$0.45 \leq f_1/f \leq 0.90 \quad \text{Condition (10)}$$

$$DR_{1-2}/f \leq 0.02 \quad \text{Condition (11)}$$

where $v_2$ is the Abbe number of the second lens element, in order from the object side;

$f_1$ is the focal length of the first lens element, in order from the object side;

f is as defined above; and $DR_{1-2}$ is the on-axis spacing between the first lens element and the second lens element, in order from the object side.

It is also preferable that an aperture be located between the second lens element and the third lens element, in order from the object side.

Furthermore, where the fourth lens element from the object side has a meniscus shape, it is preferable that the following Condition (12) be satisfied $$v_1 \geq 54.0 \quad \text{Condition (12)}$$

where $v_1$ is the Abbe number of the first lens element, in order from the object side.

The image scanning unit of this invention is characterized by incorporating the image scanning lens of the present invention.

The technical meanings of the above-described Conditions (1)–(12) are explained hereinafter. First, the above-mentioned Conditions (1)–(5) will be explained.

Condition (1) relates to the central thickness of the third lens element. When the value of Condition (1) exceeds the upper limit, the image surface curvature in the meridional plane becomes excessive. When the value of Condition (1) is less than the lower limit, the image surface curvature in the meridional plane becomes too small.

Condition (2) specifies the focal length of the fourth lens element relative to that of the image scanning lens in order to sufficiently correct for spherical aberration and coma. When the value of Condition (2) is greater than the upper limit, the positive axial aberration of the fourth lens element becomes excessive, and it becomes difficult to correct for spherical aberration. Comparatively, when the value of Condition (2) is less than the lower limit, the focal length of the fourth lens element is decreased and the absolute value of the negative spherical aberration becomes excessive.

Condition (3) specifies the Abbe number of the fourth lens element. This condition is relevant for sufficient correction of chromatic aberration. When the value of Condition (3) is less than the given value, in the case where there is an aberration on the long wavelength side or short wavelength side then, where the spectrum center is green, the axial chromatic aberration becomes excessive.

Condition (4) specifies the overall length of the image scanning lens relative to its focal length. This condition is relevant for sufficient maintenance of the image surface quality and for compactness of the image scanning lens. When the value of Condition (4) is greater than the upper limit, the overall length of the image scanning lens becomes undesirably large. Comparatively, when the value is less than the lower limit, the image surface curvature increases excessively. When attempting to correct for this curvature, coma becomes excessive.

Condition (5) specifies the on-axis spacing between the third lens element and the fourth lens element relative to the focal length of the lens. An important characteristic of the present invention is that the on-axis spacing between the third lens element and the fourth lens element is small relative to the focal length of the lens, which enables the fourth lens element diameter to be small relative to the focal length of the lens. Thus, this enables the image scanning lens to be compact and the image surface curvature to be small.

Next, the above-mentioned Condition (6) will be explained. Condition (6) also specifies the on-axis spacing between the third lens element and the fourth lens element relative to the focal length of the image scanning lens. When the value of Condition (6) is greater than the upper limit, the image surface curvature becomes excessive, and sufficient correction thereof cannot be achieved. On the other hand, when the value of Condition (6) is less than the lower limit, the image surface curvature is lessened and the balancing of aberrations to correct spherical aberration is adversely affected.

Next, the Conditions (7)–(8) will be explained.

Condition (7) specifies the overall length of the image scanning lens relative to its focal length, similar to the above-mentioned Condition (4). This condition is relevant for sufficient maintenance of the image surface quality, and for size reduction of the image scanning lens. When the value of Condition (7) is greater than the upper limit, the overall length of the image scanning lens is undesirably large relative to its focal length.

Condition (8) specifies the Abbe number of the fourth lens element. This condition is relevant for sufficient correction of chromatic aberration. If Condition (8) is not satisfied, it becomes difficult to correct for axial chromatic aberration and lateral color, in addition to maintaining the above-mentioned Condition (7).

Next, Conditions (9)–(12) will be explained.

Condition (9) specifies the Abbe number of the second lens element. This condition is relevant for effective correction of chromatic aberration. If Condition (9) is not satisfied, it becomes difficult to correct axial chromatic aberration and lateral color.

Condition (10) specifies the total length of the first lens element relative to the focal length of the image scanning lens, and effectively corrects the spherical aberration, coma, and distortion. When the value of Condition (10) is greater than the upper limit, the amount of negative spherical aberration becomes excessive. On the other hand, when the value of Condition (10) is less than the lower limit, the occurrence of positive axial chromatic aberration in the first lens element becomes excessive. This, in turn, makes it difficult to correct for spherical aberration.

Condition (11) specifies the on-axis spacing between the first lens element and the second lens element relative to the focal length of the lens. When the value of Condition (11) is greater than the given value, positive distortion becomes excessive.

Condition (12) specifies the Abbe number of the first lens element. This condition is relevant for effective correction of the chromatic aberration. If Condition (12) is not satisfied, it becomes difficult to establish a balance between the axial chromatic aberration and lateral color.

Four specific embodiments of the invention will now be explained in general terms, with reference to the drawings.

Figure 6:
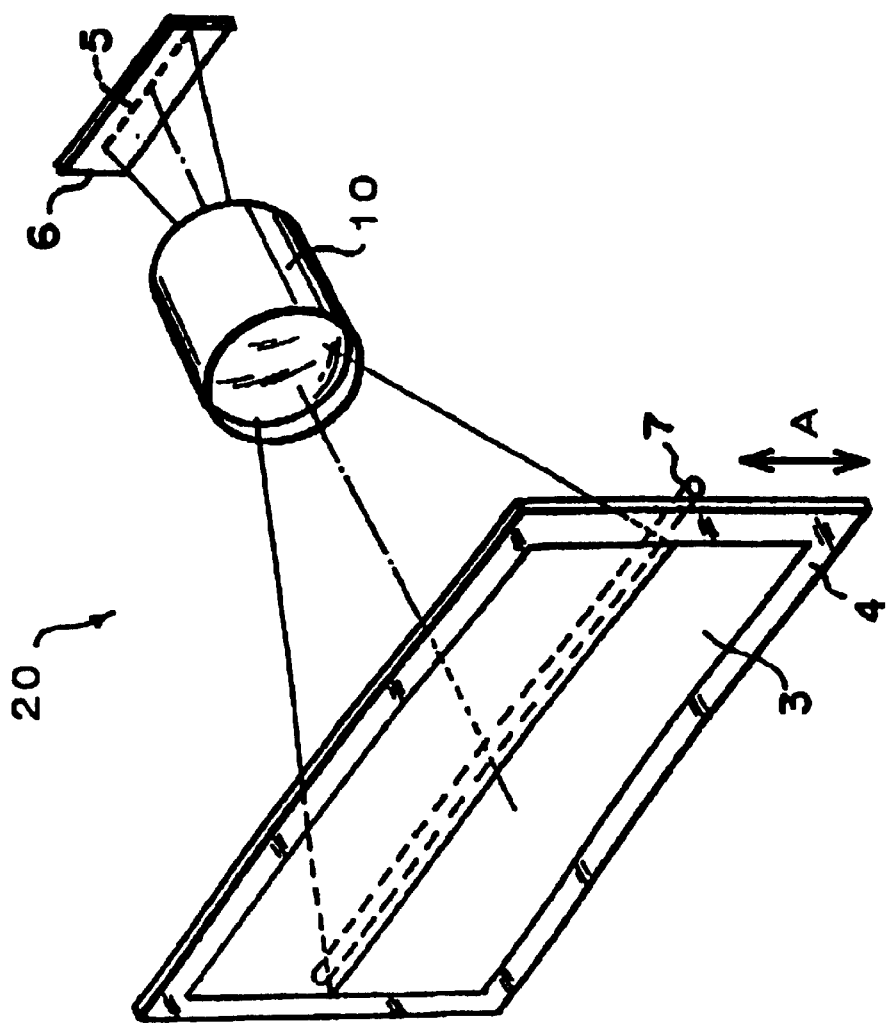
FIG. 6 shows the components of an image scanning unit which uses the image scanning lens of the present invention.

As illustrated in FIG. 6, the image scanning lens of the present invention is for use with an image scanning unit 20. In image scanning unit 20, image scanning lens 10 is arranged between a glass plate 4 and a CCD cover glass 6. A manuscript page 3 is placed adjacent the glass plate 4. The CCD cover glass 6 overlays CCD array 5, which may have one line or several lines of detectors arranged side-by-side. A lighting system 7 is arranged on the glass plate 4 at the side of the image scanning lens 10.

By relatively, shifting the manuscript page 3 in the 'A' direction, which is perpendicular to the array direction of the CCD array 5 in relation to the optical axis of the image scanning lens, scanning the image on the manuscript page 3 is achieved.

FIG. 1 shows the basic lens element construction for Embodiments 1–4 of the present invention. As illustrated in FIG. 1, four lens elements $L_1$–$L_4$ are provided. An aperture 1 is arranged between the second lens element $L_2$ and the third lens element $L_3$. Beams of light, which are radiated along the optical axis X from the object side, are imaged on the imaging surface, which is not shown.

The first lens element $L_1$ is a positive meniscus lens, with its convex surface on the object side. The second lens element $L_2$ is a biconcave lens, having surfaces of different radii of curvature, with the surface of smaller radius of curvature on the image side. The third lens element $L_3$ is a biconvex lens. The fourth lens element $L_4$ is a negative lens having a concave surface on the object side. In Embodiments 1–3, this lens element has a meniscus shape. In Embodiment 4, the surface of this lens element is planar on the image side; thus, this lens element is plano-concave.

Embodiments 1–4 will now be discussed in detail. Although the focal length for each embodiment has been normalized to be 100 mm in each of the following embodiments, in practice, the focal length may be suitably altered by those of ordinary skill in the art according to the most suitable condition, based upon the document size and the resolution power needed.

Embodiment 1

Table 1 below lists the surface number # in order from the object side, the radius of curvature R (in mm) of each lens element surface, the on-axis surface spacing D (in mm), as well as the index of refraction $N_d$ (at the sodium d-line) and the Abbe number ν of each lens element for Embodiment 1. In addition, the overall focal length f of the image scanning lens, the f-number $F_{NO}$, the standard wavelength λ, the magnification factor β of the image scanning lens, and the angle of view 2ω are indicated in the mid-portion of Table 1. The calculated values for light at the standard wavelength (that of the sodium d line) are given for each of the values that correspond to the Conditions (1)–(12) in the lower portion of the table.

TABLE 1

| # | R | D | Nd | ν |
|---|---|---|---|---|
| 1 | 23.68 | 12.6 | 1.6413 | 55.5 |
| 2 | 71.33 | 1.10 | | |
| 3 | −278.5 | 2.80 | 1.7231 | 29.5 |
| 4 | 31.49 | 2.85 | | |
| 5 | ∞(stop) | 2.31 | | |
| 6 | 57.54 | 11.41 | 1.7056 | 41.1 |
| 7 | −57.54 | 5.54 | | |
| 8 | −19.7 | 9.19 | 1.5926 | 41.0 |
| 9 | −37.37 | | | | f = 100 mm   $F_{NO}$ = 6.0   λ = 587.56 nm   β = −0.18898   2ω = 40.0°

Condition:

| 1 | $DR_3/f$ | = | 0.114 |
| 2 | $f_4/f$ | = | −0.872 |
| 3,8 | $ν_4$ | = | 41.0 |
| 4,7 | $ΣD_i/f$ | = | 0.478 |
| 5,6 | $DR_{3-4}/f$ | = | 0.055 |
| 9 | $ν_2$ | = | 29.5 |
| 10 | $f_1/f$ | = | 0.501 |
| 11 | $DR_{1-2}/f$ | = | 0.011 |
| 12 | $ν_1$ | = | 55.5 |

As is apparent from the lower portion of Table 1 above. Conditions (1)–(5) and (7)–(12) are satisfied by the image scanning lens of Embodiment 1. FIGS. 2A, 2B, and 2C show the spherical aberration, astigmatism, and distortion, respectively, for the image scanning lens of Embodiment 1. Aberrations for the 'e', 'g' and 'C' lines are illustrated in each figure. Further, the astigmatism is illustrated in both the sagittal (S) and tangential (T) planes. As is apparent from these figures. Embodiment 1 provides sufficient correction of these aberrations so as to provide a high resolution scanned image.

Embodiment 2

Table 2 below lists the surface number # in order from the object side, the radius of curvature R (in mm) of each lens element surface, the on-axis surface spacing D (in mm), as well as the index of refraction $N_d$ (at the sodium d-line) and the Abbe number ν of each lens element for Embodiment 2. In addition, the overall focal length f of the image scanning lens, the f-number $F_{NO}$, the standard wavelength λ, the magnification factor β of the image scanning lens, and the angle of view 2ω are indicated in the mid-portion of Table 2. The calculated values for light at the standard wavelength (that of the sodium d line) are given for each of the values that correspond to the Conditions (1)–(12) in the lower portion of the table.

TABLE 2

| # | R | D | $N_d$ | ν |
|---|---|---|---|---|
| 1 | 28.03 | 12.3 | 1.7162 | 53.9 |
| 2 | 103.59 | 1.17 | | |
| 3 | −159.96 | 2.02 | 1.7254 | 34.7 |
| 4 | 27.63 | 3.79 | | |
| 5 | ∞(stop) | 0.76 | | |
| 6 | 69.61 | 13.99 | 1.7162 | 53.9 |
| 7 | −33.74 | 1.84 | | |
| 8 | −29.84 | 6.68 | 1.5168 | 54.6 |
| 9 | −157.05 | | | | f = 100 mm   $F_{NO}$ = 6.0   λ = 587.56 nm   β = −0.18898   2ω = 45.8°

Condition:

| 1 | $DR_3/f$ | = | 0.14 |
| 2 | $f_4/f$ | = | −0.726 |
| 3,8 | $ν_4$ | = | 54.6 |
| 4,7 | $ΣD_i/f$ | = | 0.42 |
| 5,6 | $DR_{3-4}/f$ | = | 0.018 |
| 9 | $ν_2$ | = | 34.7 |
| 10 | $f_1/f$ | = | 0.503 |
| 11 | $DR_{1-2}/f$ | = | 0.0117 |
| 12 | $ν_1$ | = | 53.9 |

Figure 3C:
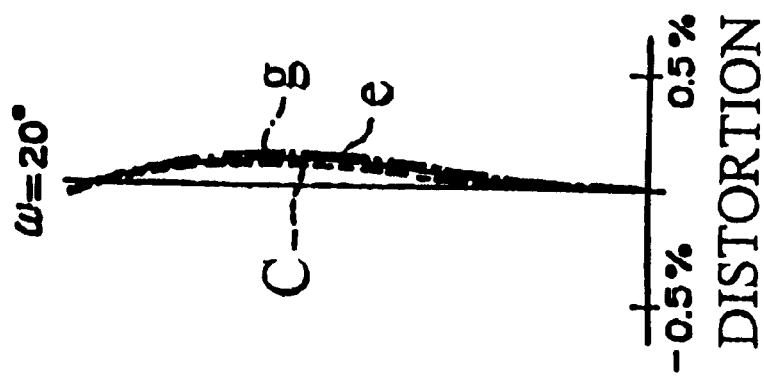
FIGS. 3A, 3B, and 3C show the spherical aberration, astigmatism, and distortion, respectively, for the image scanning lens of Embodiment 2.
Figure 3B:
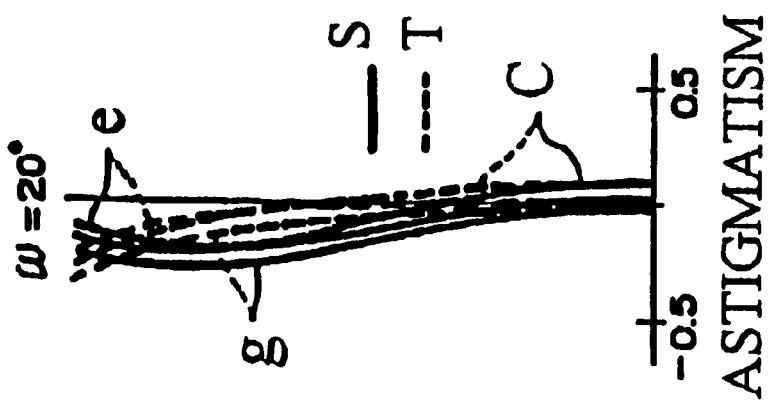
Figure 3A:

As is apparent from the lower portion of Table 2 above, Conditions (1)–(11) are satisfied by the image scanning lens of Embodiment 2. FIGS. 3A, 3B, and 3C show the spherical aberration, astigmatism, and distortion, respectively, for the image scanning lens of Embodiment 2. Aberrations for the 'e', 'g' and 'C' lines are illustrated in each figure. Further, the astigmatism is illustrated in both the sagittal (S) and tangential (T) planes. As is apparent from these figures, Embodiment 2 provides sufficient correction of these aberrations so as to provide a high resolution scanned image.

Embodiment 3

Table 3 below lists the surface number # in order from the object side, the radius of curvature R (in mm) of each lens element surface, the on-axis surface spacing D (in mm), as well as the index of refraction $N_d$ (at the sodium d-line) and the Abbe number ν of each lens element for Embodiment 3. In addition, the overall focal length f of the image scanning lens, the f-number $F_{NO}$, the standard wavelength λ, the magnification factor β of the image scanning lens, and the angle of view 2ω are indicated in the mid-portion of Table 3. The calculated values for light at the standard wavelength (that of the sodium d line) are given for each of the values that correspond to the Conditions (1)–(12) in the lower portion of the table.

TABLE 3

| # | R | D | $N_d$ | ν |
|---|---|---|---|---|
| 1 | 26.82 | 12.69 | 1.5618 | 61.1 |
| 2 | 75.78 | 1.77 | | |
| 3 | −130.62 | 2.13 | 1.6442 | 34.6 |
| 4 | 33.84 | 2.46 | | |
| 5 | ∞(stop) | 1.78 | | |
| 6 | 64.67 | 15.19 | 1.7762 | 49.6 |
| 7 | −28.19 | 0.8 | | |
| 8 | −23.13 | 5.12 | 1.5434 | 47.2 |
| 9 | −410.47 | | | | f = 100 mm   $F_{NO}$ = 6.0   λ = 587.56 nm   β = −0.18898   2ω = 47.2°

Condition:

| 1 | $DR_3/f$ | = | 0.152 |
| 2 | $f_4/f$ | = | −0.453 |
| 3,8 | $ν_4$ | = | 47.2 |
| 4,7 | $ΣD_i/f$ | = | 0.42 |
| 5,6 | $DR_{3-4}/f$ | = | 0.008 |
| 9 | $ν_2$ | = | 34.6 |

TABLE 3-continued

| | | | |
|---|---|---|---|
| 10 | $f_1/f$ | = | 0.676 |
| 11 | $DR_{1-2}/f$ | = | 0.0177 |
| 12 | $v_1$ | = | 61.1 |

Figure 4C:
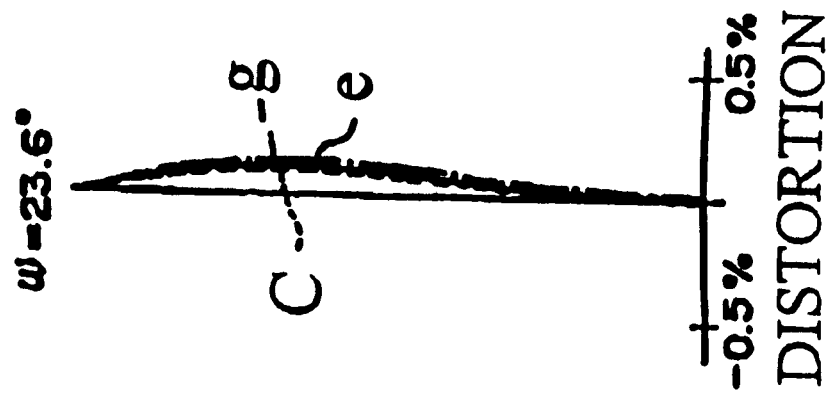
FIGS. 4A, 4B, and 4C show the spherical aberration, astigmatism, and distortion, respectively, image scanning lens of Embodiment 3.
Figure 4B:
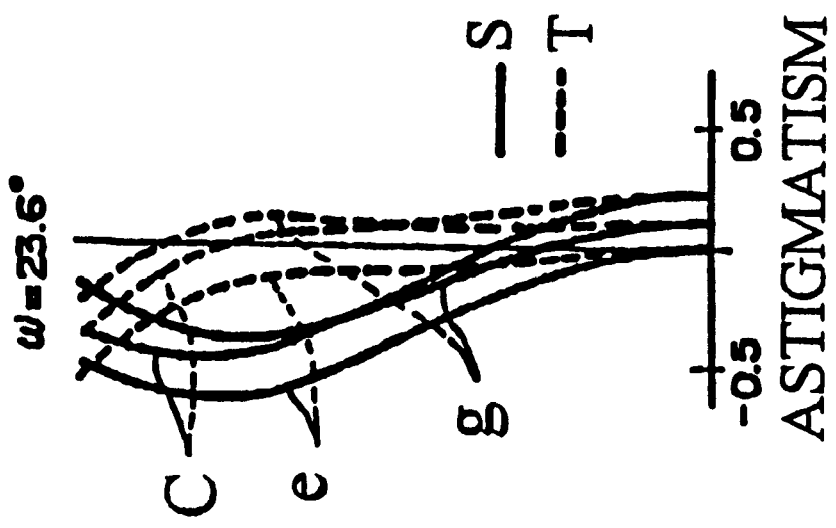
Figure 4A:
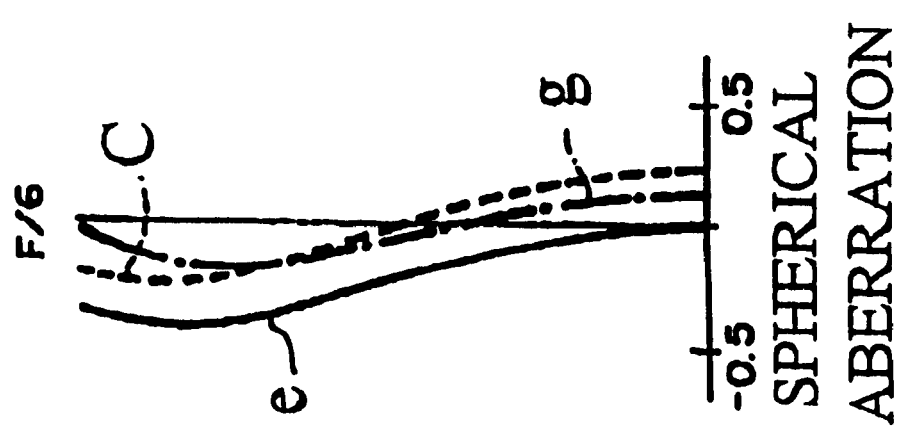

As is apparent from the lower portion of Table 3 above, Conditions (1)–(12) are satisfied by the image scanning lens of Embodiment 3. FIGS. 4A, 4B, and 4C show the spherical aberration, astigmatism, and distortion, respectively, for the image scanning lens of Embodiment 3. Aberrations for the 'e', 'g' and 'C' lines are illustrated in each figure. Further, the astigmatism is illustrated in both the sagittal (S) and tangential (T) planes. As is apparent from these figures. Embodiment 3 provides sufficient correction of these aberrations so as to provide a high resolution scanned image.

EMBODIMENT 4

Table 4 belong lists the surface number # in order from the object side, the radius of curvature R (in mm) of each lens element surface, the on-axis surface spacing D (in mm), as well as the index of refraction $N_d$ (at the sodium d-line) and the Abbe number v of each lens element for Embodiment 4. In addition, the overall focal length f of the image scanning lens, the f-number $F_{NO}$, the standard wavelength λ, the magnification factor β of the image scanning lens, and the angle of view 2ω are indicated in the mid-portion of Table 4. The calculated values for light at the standard wavelength (that of the sodium d line) are given for each of the values that correspond to the Conditions (1)–(12) in the lower portion of the table.

TABLE 4

| # | R | D | $N_d$ | v |
|---|---|---|---|---|
| 1 | 27.13 | 12.6 | 1.5618 | 61.1 |
| 2 | 72.43 | 1.77 | | |
| 3 | −147.15 | 2.3 | 1.6522 | 33.8 |
| 4 | 37.85 | 2.85 | | |
| 5 | ∞(stop) | 2.37 | | |
| 6 | 65.78 | 15.2 | 1.7762 | 49.6 |
| 7 | −27.46 | 0.76 | | |
| 8 | −22.32 | 5.14 | 1.5434 | 47.2 |
| 9 | ∞ | | | | f = 100 mm  $F_{NO}$ = 6.0  λ = 587.56 nm  β = −0.18898  2ω = 47.0°

Condition:

| | | | |
|---|---|---|---|
| 1 | $DR_3/f$ | = | 0.152 |
| 2 | $f_4/f$ | = | −0.411 |
| 3,8 | $v_4$ | = | 47.2 |
| 4,7 | $\Sigma D_i/f$ | = | 0.42 |
| 5,6 | $DR_{3-4}/f$ | = | 0.008 |
| 9 | $v_2$ | = | 33.8 |
| 10 | $f_1/f$ | = | 0.702 |
| 11 | $DR_{1-2}/f$ | = | 0.0177 |
| 12 | $v_1$ | = | 61.1 |

Figure 5C:
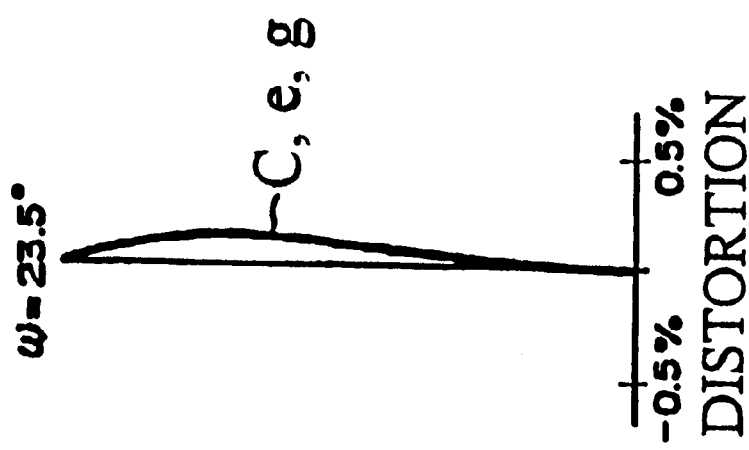
FIGS. 5A, 5B, and 5C show the spherical aberration, astigmatism, and distortion, respectively, for the image scanning lens of Embodiment 4.
Figure 5B:
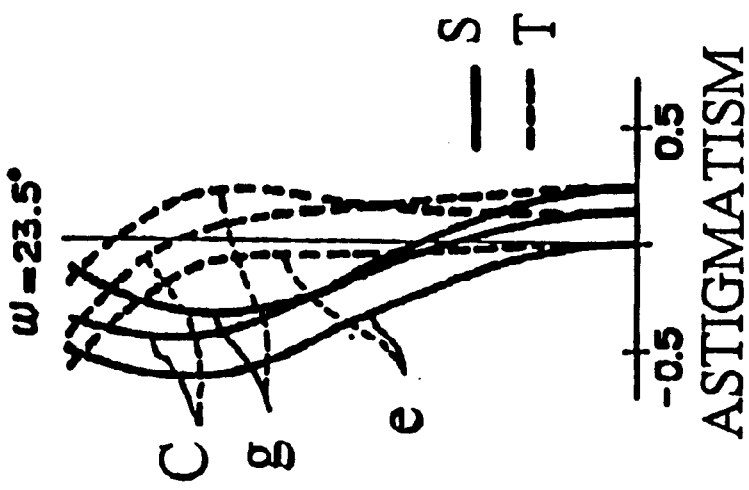
Figure 5A:
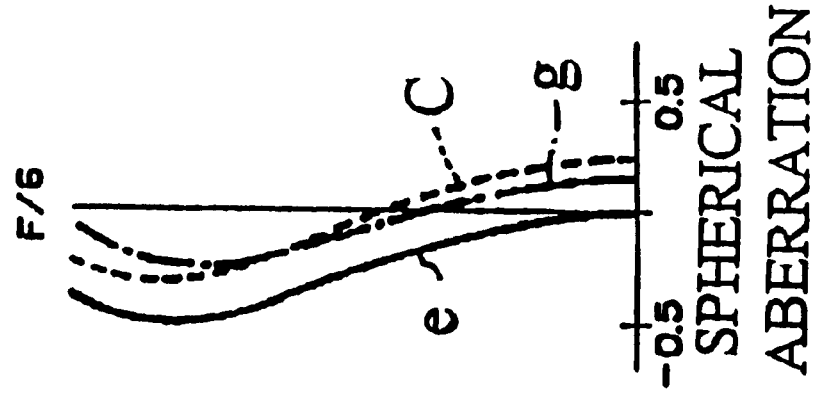

As is apparent from the lower portion of Table 4 above, Conditions (1)–(12) are satisfied by the image scanning lens of Embodiment 4. FIGS. 5A, 5B, and 5C show the spherical aberration, astigmatism, and distortion, respectively, for the image scanning lens of Embodiment 4. Aberrations for the 'e', 'g' and 'C' lines are illustrated in each figure. Further, the astigmatism is illustrated in both the sagittal (S) and tangential (T) planes. As is apparent from these figures, Embodiment 4 provides sufficient correction of these aberrations so as to provide high a resolution scanned image.

When the image scanning lens of the present invention is installed in an image scanning unit, such as a facsimile or a color scanner, the image quality of scanned documents is excellent, since aberrations are effectively controlled, and the scanning unit can be made more compact with a wider angle of view than was previously available.

The invention being thus described, it will be obvious that the same may be varied in many ways. For example the construction values may be readily scaled to achieve a lens for a scanner unit of any desired focal length or image resolution. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An image scanning lens for a scanning unit, said image scanning lens formed of, in order from the object side, only four lens elements having refractive power as follows:

a first lens element of positive refractive power and meniscus shape having its convex surface on the object side;

a second lens element of negative refractive power that is biconcave;

a third lens element of positive refractive power that is biconvex; and a fourth lens element of negative refractive power having a concave surface on the object side;

wherein the following conditions are satisfied:

$0.09 \leq DR_3/f \leq 0.20$ $0.40 \leq |f_4/f| \leq 1.30$ $v_4 \geq 36.0$ $0.31 \leq \Sigma D_i/f \leq 0.48$ $DR_{3-4}/f \leq 0.07$ where $DR_3$ is the on-axis thickness of the third lens element, in order from the object side;

f is the focal length of the image scanning lens;

$f_4$ is the focal length of the fourth lens element, in order from the object side;

$v_4$ is the Abbe number of the fourth lens element, in order from the object side;

$\Sigma D_i$ is the overall length of the image scanning lens; and $DR_{3-4}$ is the on-axis spacing between the third lens element and the fourth lens element, in order from the object side.

2. The image scanning lens of claim 1, wherein said fourth lens element has a meniscus shape.

3. The image scanning lens of claim 2, in combination with an image scanning unit that includes a CCD array.

4. The image scanning lens of claim 1, wherein said fourth lens element is plano-concave.

5. The image spanning lens of claim 4, in combination with an image scanning unit that includes a CCD array.

6. The image scanning lens of claim 1, in combination with an image scanning unit that includes a CCD array.

7. An image scanning lens for a scanning unit, said image scanning lens formed of, in order from the object side, only four lens elements having refractive power as follows:

a first lens element of positive refractive power and meniscus shape having its convex surface on the object side;

a second lens element of negative refractive power that is biconcave;

a third lens element of positive refractive power that is biconvex; and a fourth lens element of negative refractive power having a concave surface on the object side;

wherein the following conditions are satisfied:

$$0.005 \leq DR_{3-4}/f \leq 0.02$$

$$\Sigma D_i/f \leq 0.45$$

$$\nu_4 \geq 36.0$$

where $DR_{3-4}$ is the on-axis spacing between the third lens element and the fourth lens element, in order from the object side;

f is the focal length of the image scanning lens;

$\Sigma D_i$ is the overall length of the image scanning lens; and $\nu_4$ is the Abbe number of the fourth lens element, in order from the object side.

8. The image scanning lens of claim 7, wherein said fourth lens element has a meniscus shape.

9. The image scanning lens of claim 8, in combination with an image scanning unit that includes a CCD array.

10. The image scanning lens of claim 7, wherein said fourth lens element is plano-concave.

11. The image scanning lens of claim 10, in combination with an image scanning unit that includes a CCD array.

12. The image scanning lens of claim 7, in combination with an image scanning unit that includes a CCD array.

* * * * *

UNITED STATES PATENT AND TRADEMARK OFFICE
CERTIFICATE OF CORRECTION

PATENT NO.    : 6,288,820 B1
DATED         : September 11, 2001
INVENTOR(S)   : Noda It is certified that error appears in the above-identified patent and that said Letters Patent is hereby corrected as shown below:

Title page,
Under Foreign Application Priority Data, delete:
-- Jul. 26, 1999 (JP).....................11-210661 --;

Column 1,
Line 53, after "respectively," insert -- for the --;

Column 2,
Line 35, change "$\leq$" to -- $\geq$ --;

Column 4,
Line 44, change "relatively, shifting" to -- relatively shifting --;

Column 5,
Lines 13 and 61, change "$F_{NO}$," to -- $F_{NO}$, --;
Line 51, change "figures." to -- figures, --;

Column 6,
Line 41, change "$F_{NO}$," to -- $F_{NO}$, --;

Column 7,
Line 24, change "$F_{NO}$," to -- $F_{NO}$, --; and,

Column 8,
Line 1, change "image spanning" to -- image scanning --.

Signed and Sealed this

Fourteenth Day of May, 2002

*Attest:*

*Attesting Officer*

JAMES E. ROGAN
*Director of the United States Patent and Trademark Office*